US011618189B2

(12) United States Patent
Kubota

(10) Patent No.: US 11,618,189 B2
(45) Date of Patent: Apr. 4, 2023

(54) INJECTION MOLDING MACHINE INCLUDING OPERATING STATE STORAGE UNIT

(71) Applicant: FANUC Corporation, Yamanashi (JP)

(72) Inventor: Kazuo Kubota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 91 days.

(21) Appl. No.: 15/138,215

(22) Filed: Apr. 26, 2016

(65) Prior Publication Data
US 2016/0332347 A1 Nov. 17, 2016

(30) Foreign Application Priority Data
May 11, 2015 (JP) .............................. JP2015-096801

(51) Int. Cl.
B29C 45/03 (2006.01)
B29C 45/17 (2006.01)
B29C 45/76 (2006.01)

(52) U.S. Cl.
CPC .......... B29C 45/03 (2013.01); B29C 45/1774 (2013.01); B29C 45/76 (2013.01); B29C 2945/76939 (2013.01)

(58) Field of Classification Search
CPC ...... B29C 45/03; B29C 45/1774; B29C 45/76
See application file for complete search history.

(56) References Cited

U.S. PATENT DOCUMENTS

| 4,421,467 A * | 12/1983 | Richmond ............ B29C 45/768 425/136 |
| 5,216,617 A | 6/1993 | Kamiguchi et al. |
| 2003/0080452 A1 | 5/2003 | Bulgrin et al. |
| 2004/0044434 A1* | 3/2004 | Morimura ............... B29C 45/76 700/197 |
| 2005/0098912 A1 | 5/2005 | Haruo et al. |

FOREIGN PATENT DOCUMENTS

| CN | 1640647 A | 7/2005 |
| DE | 68917301 T2 | 11/1994 |
| DE | 60224967 T2 | 11/2008 |
| DE | 102011112736 A1 | 4/2012 |
| JP | 4-175132 A | 6/1992 |
| JP | 8-132502 A | 5/1996 |
| JP | 10-138322 A | 5/1998 |
| JP | 2003-1686 A | 1/2003 |

(Continued)

OTHER PUBLICATIONS

Office Action in JP Application No. 2015-096801, dated Jul. 26, 2016.

(Continued)

Primary Examiner — Joseph S Del Sole
Assistant Examiner — John Robitaille
(74) Attorney, Agent, or Firm — Hauptman Ham, LLP

(57) ABSTRACT

In an injection molding machine, operating state identification codes, a change between which coincides with a change pattern stored in a change pattern storage unit, are replaced with a change pattern-associated identification code associated with the change pattern. This allows even a less-experienced person to easily grasp work contents indicated by an operating state.

15 Claims, 7 Drawing Sheets

(56) References Cited

FOREIGN PATENT DOCUMENTS

| JP | 2003-33958 A | 2/2003 |
| JP | 2004-155071 A | 6/2004 |
| JP | 2004-198148 A | 7/2004 |
| JP | 2012-153077 A | 8/2012 |

OTHER PUBLICATIONS

Office Action in CN Application No. 201610306201.3, dated Jul. 20, 2017, 25 pp.
Office Action in DE Application No. 102016005567.7, dated Jan. 11, 2018, 10 pp.

* cited by examiner

FIG. 2
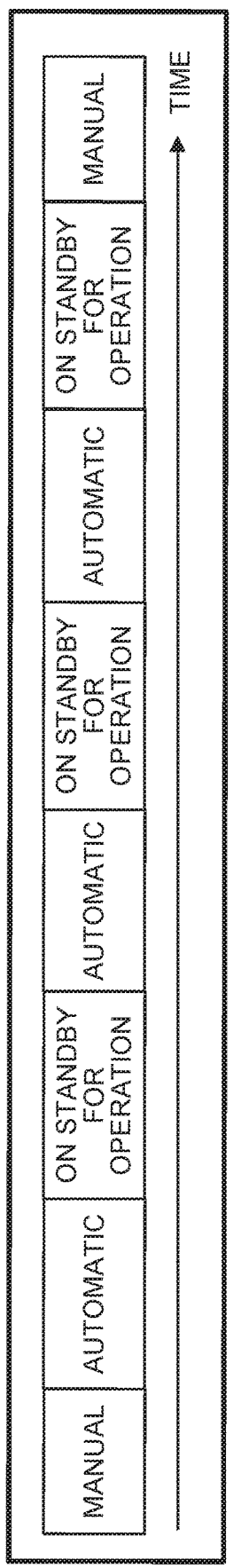
FIG. 3
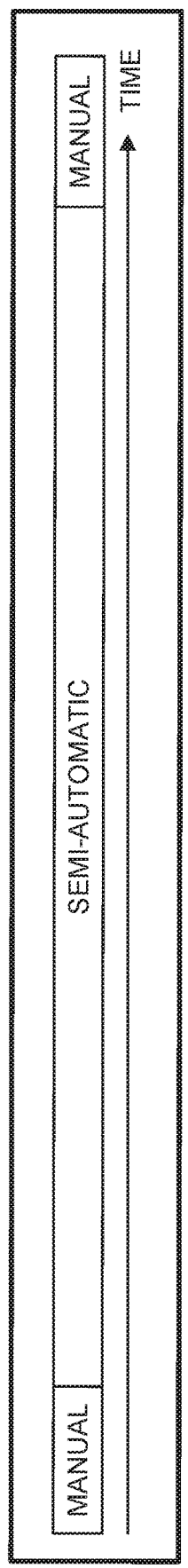
FIG. 4
| No | USER-DEFINED OPERATING STATE | CHANGE PATTERN OF BUILT-IN OPERATING STATES | | | |
|---|---|---|---|---|---|
| | | 1 | 2 | 3 | 4 |
| 1 | SEMI-AUTOMATIC | AUTOMATIC | ON STANDBY FOR OPERATION | - | - |
| 2 | DURING RESIN SWITCHING | PURGING | MANUAL | - | - |
| 3 | DURING DIE REPLACEMENT | MANUAL | DIE HEIGHT ADJUSTMENT | MANUAL | DRY CYCLE |

FIG. 5

LIST OF ALREADY-REGISTERED USER-DEFINED OPERATING STATES

| No | USER-DEFINED OPERATING STATE | IN USE | PRIORITY |
|----|------------------------------|--------|----------|
| 1  | SEMI-AUTOMATIC               | ✓      | ↑ ↓      |
| 2  | DURING RESIN SWITCHING       |        | ↑ ↓      |
| 3  | DURING DIE REPLACEMENT       |        |          |

ADDITIONAL USER-DEFINED OPERATING STATE: DURING DIE REPLACEMENT    ADD

FIG. 6

NUMBER OF OPERATING STATE CHANGES  2  ①

| USER-DEFINED OPERATING STATE | SEMI-AUTOMATIC ② |
| BUILT-IN OPERATING STATE 1 | AUTOMATIC ③ |
| BUILT-IN OPERATING STATE 2 | ON STANDBY FOR OPERATION ④ |

SET

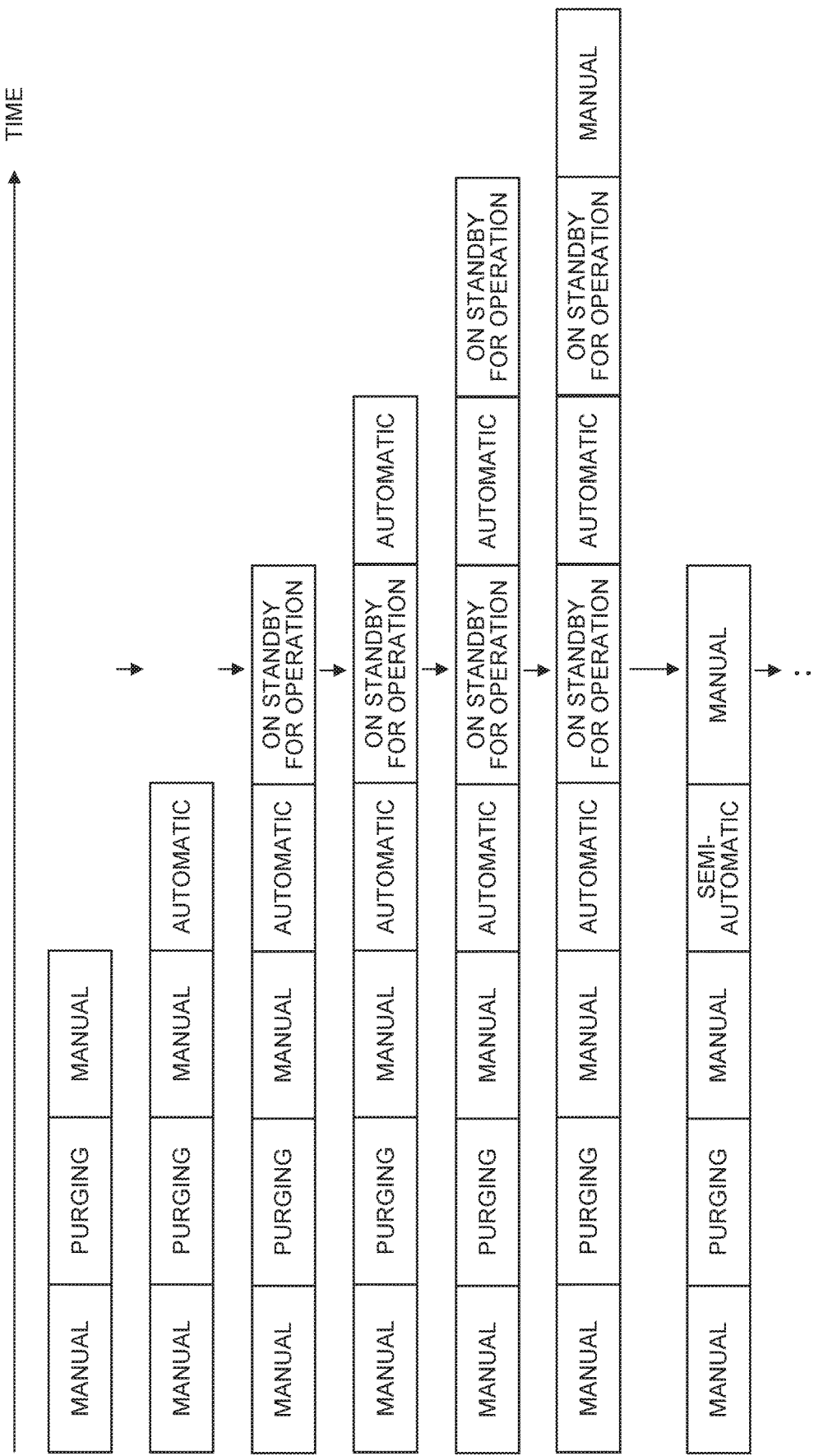

INJECTION MOLDING MACHINE INCLUDING OPERATING STATE STORAGE UNIT

RELATED APPLICATIONS

The present application claims priority to Japanese Patent Application Number 2015-096801, filed May 11, 2015, the disclosure of which is hereby incorporated by reference herein in its entirety.

BACKGROUND OF THE INVENTION

1. Field of the Invention

The present invention relates to an injection molding machine and particularly to an injection molding machine including an operating state storage unit.

2. Description of the Related Art

In management of an injection molding machine, the working condition of the injection molding machine may be managed. The management of the working condition is performed by judging whether the utilization ratio that is the ratio of operating hours to predetermined hours of the injection molding machine is at an appropriate level. In the management of the working condition, the operating state of the injection molding machine is classified as in operation, not in operation, or the like and is recorded in chronological order for collection. For operating state recording, periodic recording of the operating state of an injection molding machine by a worker has conventionally been performed. However, a worker needs to be skilled to record an operating state. If a worker is not properly trained, the worker is unable to accurately grasp an operating state. Additionally, it takes extra man-hours even for a skilled worker.

Automatic monitoring of an operating state by an injection molding machine has also been performed. At the time of the monitoring, the operating state automatically monitored by the injection molding machine is stored in chronological order. If the stored operating state is displayed on a screen in a list form or a graphic form, it is possible to refer to how the operating state changes with passage of time. This allows grasping of the past detailed operating state of the injection molding machine or the operating state of the injection molding machine at a particular time in the past. The operating state may be stored in an internal storage device of the injection molding machine or may be stored in an internal storage device of a computer for management after the injection molding machine is connected to the computer for management using a communication network.

Operating states for an injection molding machine includes "in automatic operation", "during standby for operation", and "alarmed". A control device of the injection molding machine recognizes the injection molding machine to be in automatic operation when the injection molding machine generates an in-automatic-operation signal and recognizes the injection molding machine to be alarmed when the injection molding machine generates an alarmed signal. Generally, correspondences between signals, such as an in-automatic-operation signal and an alarmed signal, to be generated by an injection molding machine and actual operating states are defined in advance by a manufacturer. An operating state judgment condition in accordance with the definition is built into the injection molding machine. The operating state of the injection molding machine that is judged in accordance with the operating state judgment condition is stored in chronological order.

The technique disclosed in Japanese Patent Application Laid-Open No. 10-138322 stores, in chronological order, pieces of data on an operating state for a given length of time from the present moment to a given time ago when an injection molding machine is in steady operation. Upon receipt of notification of fault detection, pieces of data on an operating state for the given length of time stored in a data storage unit at that time are output and are used for diagnosis for a fault in the injection molding machine.

In Japanese Patent Application Laid-Open No. 2012-153077, a change in a state signal from an injection molding machine is sensed, and the name or the code of a working state corresponding to a combination of the state of the state signal before the change and the state after the change is stored as a piece of working information upon the sensing. The working state corresponding to a particular change in state signal is stored.

Prior art techniques and the techniques disclosed in Japanese Patent Application Laid-Open No. 10-138322 and Japanese Patent Application Laid-Open No. 2012-153077 store the operating state of an injection molding machine in chronological order. In any technique, an operating state is stored as an operating state defined in advance. For this reason, a less-experienced engineer or manager, in particular, can grasp that an operating state is changing but may have difficulty in grasping which kind of work a change in the operating state indicates.

SUMMARY OF THE INVENTION

Under the above-described circumstances, an object of the present invention is to provide an injection molding machine which allows even a less-experienced engineer or manager to easily grasp work contents indicated by an operating state.

An injection molding machine according to the present invention is an injection molding machine including an operating state outputting unit which outputs an operating state identification code corresponding to an operating state after change if an operating state changes, and an operating state storage unit which stores a plurality of the operating state identification codes output by the operating state outputting unit in chronological order, in which the injection molding machine includes a change pattern setting unit which sets a change pattern of the operating state that is composed of a plurality of the operating state identification codes and a change pattern-associated identification code that is an identification code associated with the change pattern, a change pattern storage unit which stores the change pattern and the change pattern-associated identification code in association with each other, and an operating state replacement unit which replaces the change pattern with the change pattern-associated identification code, and the operating state replacement unit replaces a set of the operating state identification codes, a change between which coincides with the change pattern stored in the change pattern storage unit, among the operating state identification codes stored in the operating state storage unit, with the change pattern-associated identification code associated with the change pattern.

With this configuration, a determined change between operating state identification codes is replaced with a change pattern-associated identification code easier for a worker to understand and is stored. This allows a less-experienced person to easily grasp work contents indicated by an operating state.

The operating state replacement unit may collectively replace sets of the operating state identification codes in a section, where a change between the operating state identification codes coincides with the change pattern stored in the change pattern storage unit, with the change pattern-associated identification code associated with the change pattern.

With this configuration, operating states stored in the operating state storage unit can be collectively replaced with a change pattern-associated identification code.

The operating state replacement unit may replace the operating state identification codes with the change pattern-associated identification code associated with the change pattern each time a change between the operating state identification codes coincides with the change pattern stored in the change pattern storage unit, and may replace a plurality of occurrences of the change pattern-associated identification code with a single occurrence of the change pattern-associated identification code if there are the occurrences of the change pattern-associated identification code in a row.

With this configuration, operating states can be replaced with a change pattern-associated identification code simultaneously with storage of the operating states in the operating state storage unit.

The change pattern setting unit may be capable of setting a change pattern of the operating state which is composed of a different number of the operating state identification codes for each of the change pattern-associated identification code.

With this configuration, various types of change patterns of an operating state can be set.

The change pattern setting unit may include priority setting means for giving a priority to the change pattern-associated identification code, and the operating state replacement unit may replace the operating state identification codes, a change between which coincides with the change pattern stored in the change pattern storage unit, with the change pattern-associated identification code associated with the change pattern in descending order of the priority.

With this configuration, it is possible to clearly define a mode of replacement with a change pattern-associated identification code in a case where a plurality of change pattern-associated identification codes are set.

The change pattern setting unit may be capable of using one of a plurality of the change pattern-associated identification codes as the operating state identification code used to set a different one of the change pattern-associated identification codes.

With this configuration, it is possible to use a set change pattern-associated identification code to recursively set a different change pattern-associated identification code. This makes it easier to make settings for a change pattern-associated identification code.

The present invention allows provision of an injection molding machine, which enables a less-experienced engineer or manager to easily grasp work contents indicated by an operating state.

BRIEF DESCRIPTION OF THE DRAWINGS

The above-described and other objects and features of the present invention will be apparent from the following description of the embodiment with reference to the accompanying drawings, in which:

FIG. 2 is a chart expressing a change in the operating state of an injection molding machine in a graphic form;

FIG. 3 is a chart expressing a change in the operating state after replacement in a graphic form;

FIG. 4 is a table showing an example of association of a user-defined operating state with a change pattern of built-in operating states;

FIG. 5 is a view showing an example of a screen for setting a user-defined operating state;

FIG. 6 is a view showing a state in which the relationship between a user-defined operating state and a change pattern of built-in operating states is set;

FIG. 10 is a chart showing how operating states stored in the operating state storage unit transition in a case where replacement is performed regardless of operating state storage.

DETAILED DESCRIPTION OF THE PREFERRED EMBODIMENTS

Figure 1:
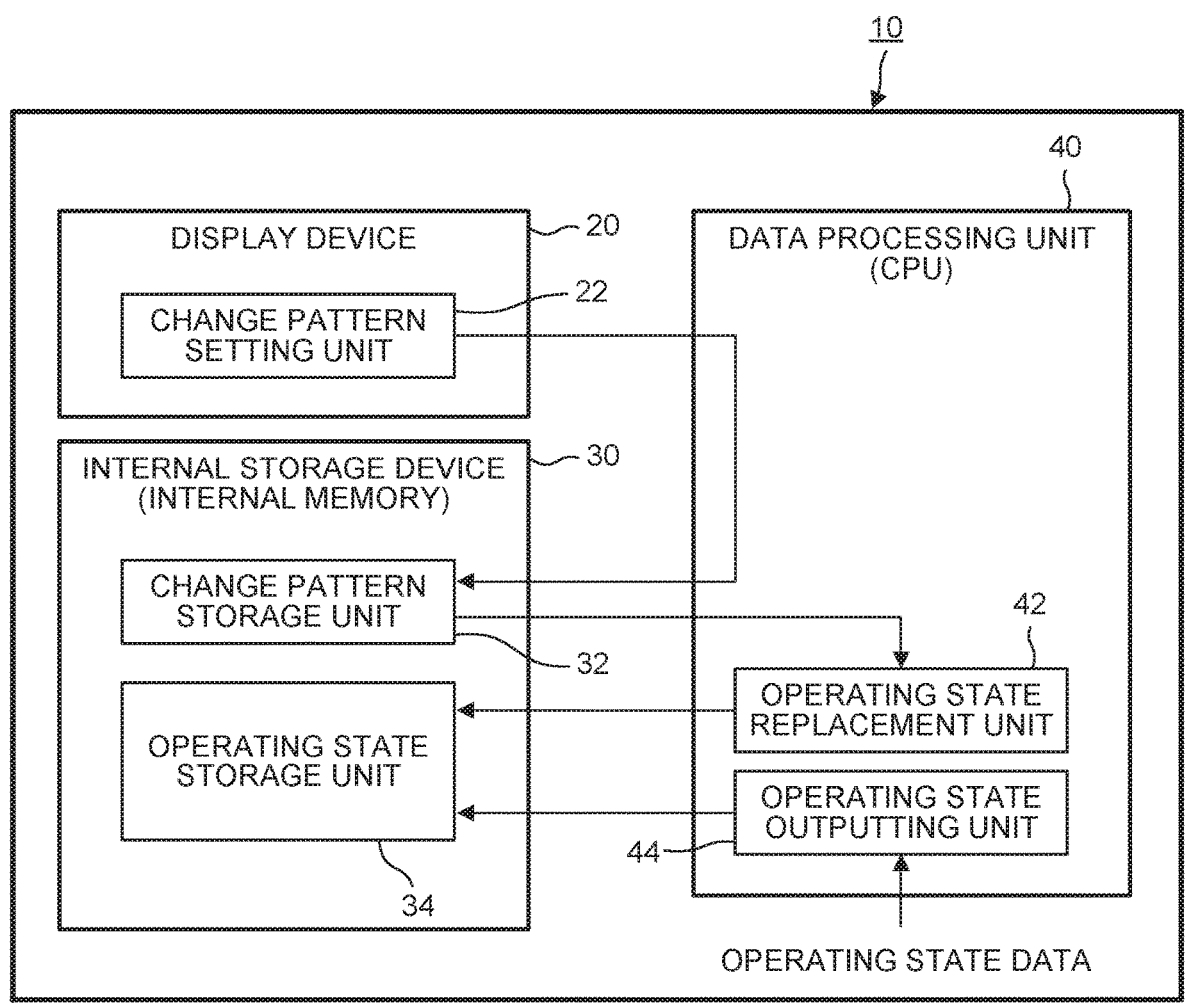
FIG. 1 is a block diagram showing a configuration according to an embodiment of the present invention.

FIG. 1 is a block diagram showing a configuration according to the present embodiment. An injection molding machine 10 includes a display device 20, an internal storage device 30, and a CPU 40 as a data processing unit. The internal storage device 30 is desirably composed of a nonvolatile memory but may be composed of any other memory. The display device 20 includes a touch panel (not shown), which constitutes a change pattern setting unit 22. The internal storage device 30 includes a change pattern storage unit 32 and an operating state storage unit 34. The CPU 40 includes an operating state replacement unit 42 and an operating state outputting unit 44.

A change pattern-associated identification code which is set at the change pattern setting unit 22 is stored in the change pattern storage unit 32. The change pattern-associated identification code is input to the operating state replacement unit 42. An operating state identification code output from the operating state outputting unit 44 and a change pattern-associated identification code which is obtained through replacement by the operating state replacement unit 42 are input to and stored in the operating state storage unit 34. Note that, in FIG. 1, the change pattern setting unit 22 is composed of the touch panel included in the display device 20. It is also possible to provide the change pattern setting unit 22 separately from the display device 20 using a keyboard or the like instead of the touch panel. In FIG. 1, a change pattern-associated identification code and an operating state identification code are stored in the internal storage device 30 provided inside the injection molding machine 10. A storage device need not be provided inside the injection molding machine 10, and a change pattern-associated identification code and an operating state identification code may be stored in an external storage medium connected to the injection molding machine 10 or may be transmitted to a computer for management and may be stored in the computer for management.

In the present embodiment, operating states for the injection molding machine are defined as described below. An operating state, in which the injection molding machine is judged to be in accordance with an operating state judgment condition built in advance into the injection molding machine before shipment of the injection molding machine, is referred to as a "built-in operating state". An operating state corresponding to a change pattern of "built-in operating states" which is set in advance is referred to as a "user-defined operating state". A user-defined operating state is defined using built-in operating states in principle but may be defined using another user-defined operating state. A definition of a user-defined operating state can be set at the change pattern setting unit 22. Both "built-in operating states" and "user-defined operating states" constitute "operating states".

FIG. 2 shows an example in which a change in the operating state of the injection molding machine is expressed in a graphic form. The terms "manual", "automatic", and "on standby for operation" in FIG. 2 refer to respective built-in operating states. The operating states are input as pieces of operating state data to the operating state outputting unit 44, are output from the operating state outputting unit 44 to the operating state storage unit 34, and are stored in the operating state storage unit 34 in chronological order. In the example shown in FIG. 2, operating states are displayed as a chronological change in operating state on the display device 20 as the operating states are stored in chronological order in the operating state storage unit 34.

In a conventional example, operating states are stored as chronological changes between built-in operating states as shown in FIG. 2 in the operating state storage unit 34. When the operating state is to be displayed on the display device 20, the operating state is displayed using built-in operating states. For this reason, if the operating state is displayed as in FIG. 2, it is possible to grasp that the operating state changes, for example, from "manual" to "automatic" and then to "on standby for operation". However, it is sometimes difficult for a less-experienced worker to grasp which kind of work a change in operating state indicates.

In the present embodiment, after operating states are stored in the operating state storage unit 34 in a state as shown in FIG. 2, some of the operating states are replaced with a user-defined operating state labeled "semi-automatic". The operating states are then stored in the operating state storage unit 34 in a form shown in FIG. 3. When a change in operating state in FIG. 2 is to be displayed on the display device 20, the change in operating state is displayed with repetitions of "automatic" and "on standby for operation" in that order replaced with "semi-automatic". A display form adopted on the display device 20 is a form without repetitions of "automatic" and "on standby for operation" in that order but with "semi-automatic". For this reason, it is easy to grasp a work represented by a change in operating state at a glance. A specific operating state replacement method will be described later.

FIG. 4 is a table showing an example of association of a user-defined operating state with a change pattern of built-in operating states. A leftmost cell has a number indicating the priority of a corresponding user-defined operating state. A next cell has the user-defined operating state, and a cell after next has a change pattern of built-in operating states constituting the user-defined operating state. In this table, "semi-automatic" is assigned as a user-defined operating state with a highest priority. Operating states constituting the operating state "semi-automatic" are shown to be the operating states "automatic" and "on standby for operation" in that order. Similarly, "during resin switching" is assigned as a user-defined operating state with a second highest priority. Operating states constituting the operating state "during resin switching" are shown to be the operating states "purging" and "manual" in that order. Additionally, "during die replacement" is assigned as a user-defined operating state with a third highest priority. Operating states constituting the operating state "during mold replacement" are shown to be the operating states "manual", "die height adjustment", "manual", and "dry cycle" in that order.

Although a built-in operating state is denoted by a name indicative of the operating state in FIG. 4, a unique identification code may be assigned to a built-in operating state, and the identification code may be displayed. As an identification code, a name, a number, symbol, or the like can be assigned. For example, the identification code "S1" can be assigned to the operating state "manual", and the identification code "S2" can be assigned to the operating state "automatic". Henceforth, to store an operating state in chronological order or replace an already-stored operating state, an identification code for the operating state is used.

A correspondence between an operating state and an identification code for the operating state may be stored in a form like a correspondence table or the correspondence may be stored by describing, as a program, which identification code is to be output for a given operating state.

In the table shown in FIG. 4, for example, the user-defined operating state "semi-automatic" shows a case where a combination of the built-in operating states "automatic" and "on standby for operation" in that order is repeated once or more. A time period for which the operating state "automatic" or "on standby for operation" lasts does not matter. The combination of the built-in operating states "automatic" and "on standby for operation" in that order may occur only once or the combination may occur a plurality of times (automatic, on standby for operation, automatic, on standby for operation, automatic, and on standby for operation in that order).

In the present embodiment, if operating states corresponding to a user-defined operating state as shown in FIG. 4 occur, the corresponding operating states are replaced with the user-defined operating state. A specific replacement method will be described later.

FIG. 5 is a view showing a state in which a user-defined operating state is set at the change pattern setting unit 22. In FIG. 5, a list of currently set user-defined operating states is shown as a table. Of the user-defined operating states, a currently used user-defined operating state is checked as a replacement target. Although only "semi-automatic" is checked in FIG. 5, a plurality of user-defined operating states may be checked and may be set as replacement targets. In this case, replacement is performed for the user-defined operating states in order of priority from highest. Note that a priority can be changed using a priority change button displayed on the right side of FIG. 5. For example, to raise the priority of "during resin switching", an up-arrow button on the right side of "during resin switching" is pressed. The press then raises the priority to a next higher rank. The priority is lowered to a next lower rank by pressing a down-arrow button.

It is possible to add a new user-defined operating state by entering the new user-defined operating state in the Additional user-defined operating state field in the lower part in FIG. 5 and pressing the Add button.

FIG. 6 is a view showing a state in which the relationship between a user-defined operating state and a change pattern of built-in operating states is set. Control shifts to a screen in FIG. 6 by entering a new user-defined operating state on a screen in FIG. 5 and pressing the Add button. To change settings for an already-registered user-defined operating state, a user-defined operating state as a change target is entered in the Additional user-defined operating state field on the screen in FIG. 5, and the Add button is then pressed. Since the press causes control to shift to the screen in FIG. 6, settings are made on the screen in FIG. 6.

In the screen in FIG. 6, Number of operating state changes indicates the number of operating states constituting a user-defined operating state. For example, the user-defined operating state "semi-automatic" is composed of the two operating states labeled "automatic" and "on standby for operation", and the number of operating state changes is 2. When a new user-defined operating state is to be added, the user-defined operating state to be added that is entered as an additional user-defined operating state in FIG. 5 is displayed in the next User-defined operating state field. When a user-defined operating state as a change target is entered in the Additional user-defined operating state field in FIG. 5, and the Add button is pressed, settings for the user-defined operating state as the change target are displayed in the User-defined operating state field.

A plurality of built-in operating states are displayed below the user-defined operating state on the screen in FIG. 6. The built-in operating states are displayed so as to correspond to the number of operating state changes. In this example, the number of operating state changes is set at 2, and two built-in operating state fields labeled Built-in operating state 1 and Built-in operating state 2 are displayed. When operating states are to be set for the user-defined operating state, the operating states are set in the order in a change pattern of operating states, and the Set button is finally pressed. With the press, the setting is completed. By setting operating states for each user-defined operating state in the above-described manner, a change pattern of operating states for each user-defined operating state shown in the table in FIG. 4 is set. Note that, to increase the number of operating state changes, a configuration which allows a change in the number of operating state changes may be adopted, and the number of built-in operating state fields may be increased with an increase in the number of operating state changes.

A procedure for storing an operating state when the operating state changes in the injection molding machine according to the present embodiment will be described with reference to FIG. 7. The procedure will be described below for each step in FIG. 7.

(Step SA1) In the injection molding machine, it is judged whether the operating state has changed. If the operating state has changed (YES), the flow advances to step SA2; otherwise (NO), the flow advances to step SA3.

(Step SA2) One record is added, and an identification code for an operating state after the change is stored in the added record.

(Step SA3) It is judged whether to end the identification code storage. If the identification code storage is to be ended (YES), the flow ends. If the storage is not to be ended and is to be continued (NO), the flow returns to step SA1.

If operating states are sequentially stored in chronological order in the above-described manner, the operating states are stored in the operating state storage unit 34 in the state shown in FIG. 2.

In the present embodiment, operating states thus stored in the operating state storage unit 34 are associated with a user-defined operating state, as shown in FIG. 4, and are replaced with the user-defined operating state. A specific replacement method will be described below. Replacement of operating states with a user-defined operating state may be performed simultaneously with storage of the operating states or may be performed regardless of the storage of the operating states.

Figure 7:
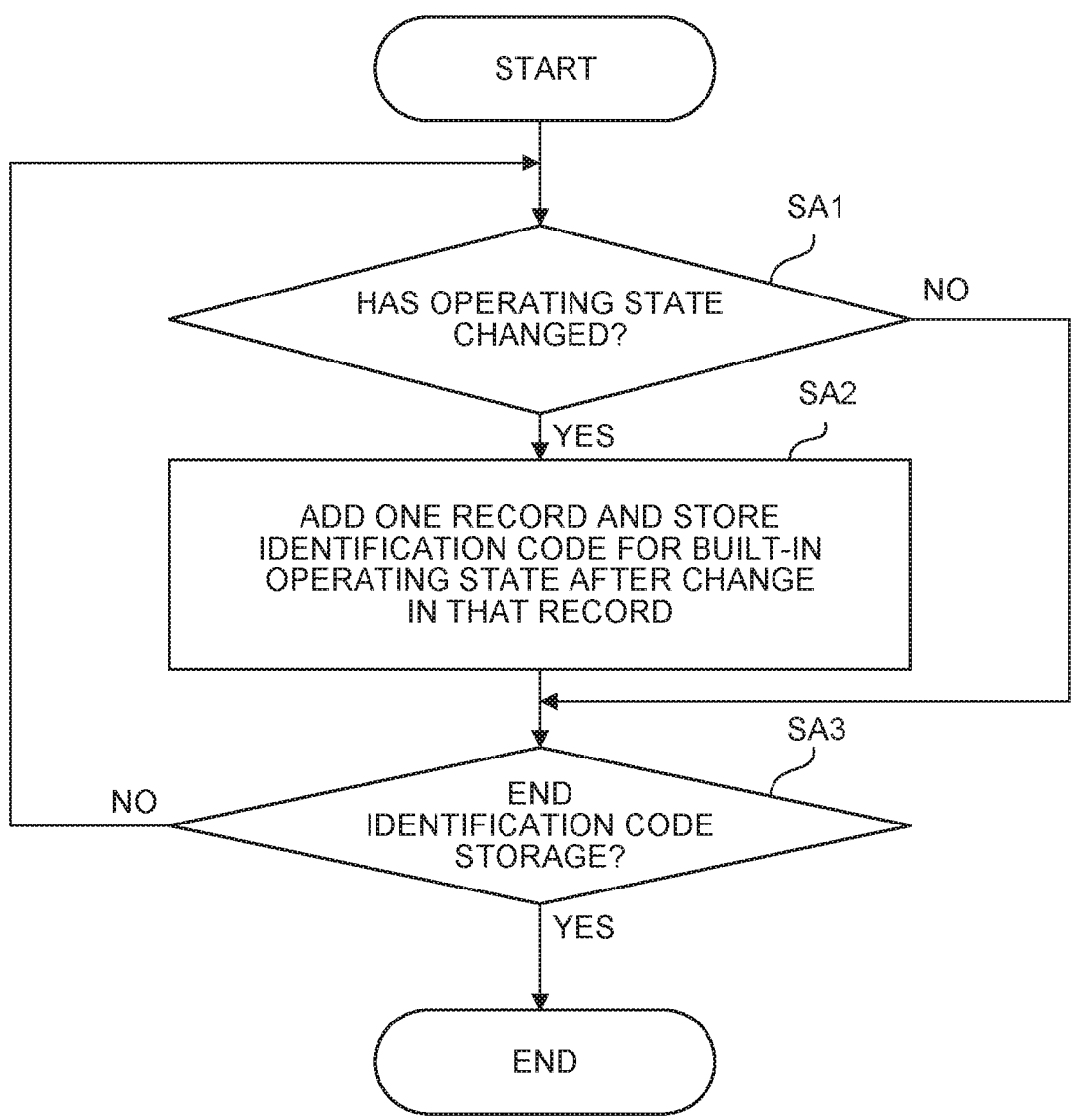
FIG. 7 is a flowchart showing a procedure for storing an operating state when the operating state is changed.
Figure 8:
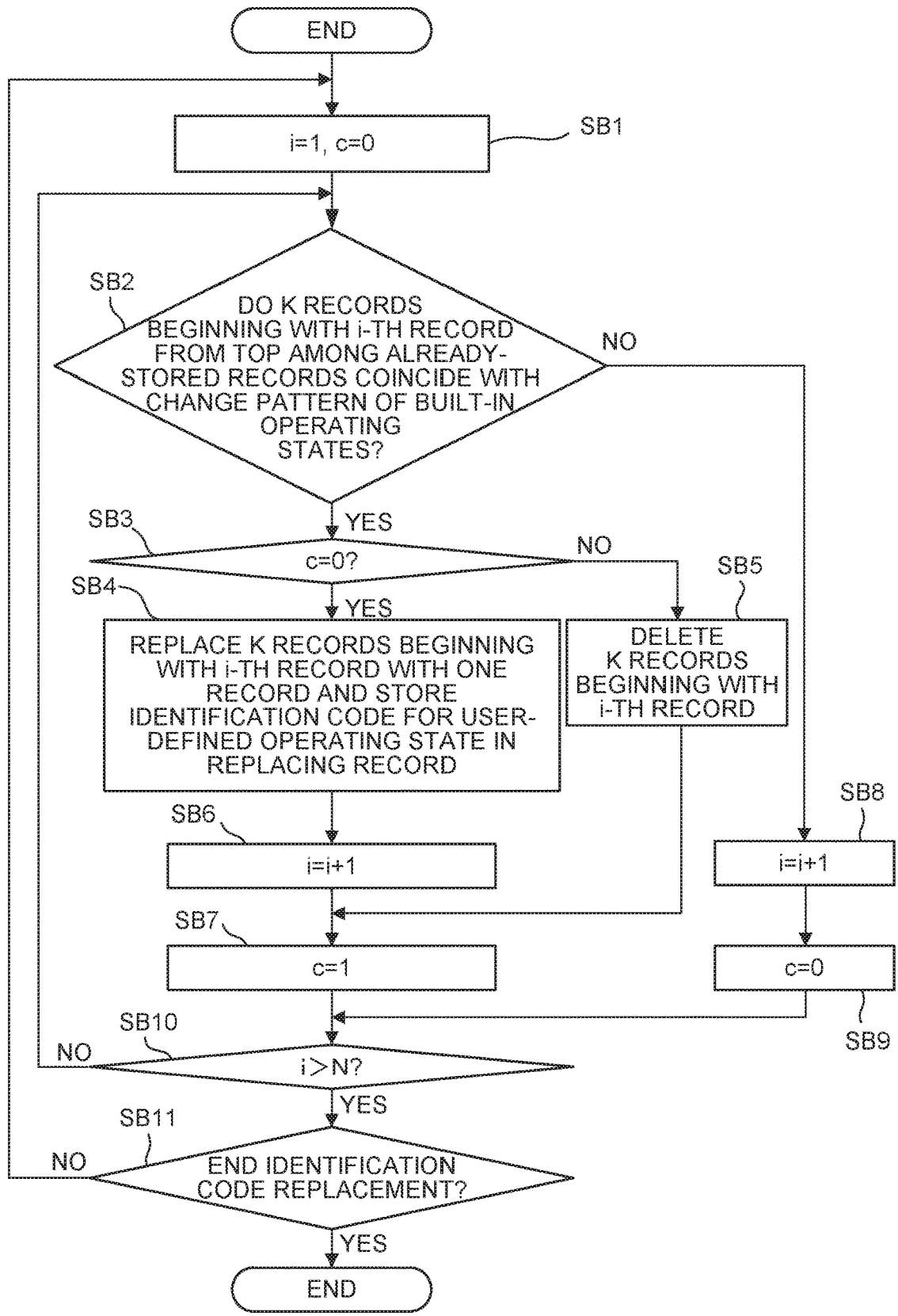
FIG. 8 is a flowchart showing a procedure for replacing already-stored operating states stored in accordance with the procedure in FIG. 7 with a user-defined operating state.

FIG. 8 is a flowchart showing a procedure for replacing already-stored operating states stored in accordance with the procedure in FIG. 7 with a user-defined operating state. The procedure will be described below step by step. Each parameter in the description below of the procedure is defined as follows:

K: the number of built-in operating states constituting a user-defined operating state (the number of operating state changes described above)

N: the number of already-stored records i: a numerical value indicating the ordinal rank of a current procedure target record from top among the already-stored records c: a flag used to judge whether a change pattern has occurred a plurality of times in a row (Step SB1) The parameters i and c are initialized to 1 and 0, respectively.

(Step SB2) It is judged whether K records beginning with an i-th record from top among already-stored records stored in the operating state storage unit 34 coincide with a change pattern of built-in operating states constituting a current target user-defined operating state. If the K records coincide with the change pattern (YES), the flow advances to step SB3; otherwise (NO), the flow advances to step SB8.

(Step SB3) It is judged whether c=0. If c=0 (YES), the flow advances to step SB4; otherwise (NO), the flow advances to step SB5.

(Step SB4) The K records beginning with the i-th record are replaced with one record, and an identification code for the corresponding user-defined operating state is stored in the replacing record.

(Step SB5) The change pattern has occurred a plurality of times in a row, and the occurrence this time is a second or subsequent occurrence. One occurrence of the change pattern has already been replaced with an identification code for the user-defined operating state. For this reason, an operation of deleting the K records this time beginning with the i-th record that coincide with the change pattern to be integrated into the identification code for the user-defined operating state that has replaced the earlier occurrence is performed.

(Step SB6) One is added to the value of i to update the value of i.

(Step SB7) The parameter c is set to 1, and the flag is updated to indicate a state within a period of coincidence with the change pattern of the built-in operating states.

(Step SB8) One is added to the value of i to update the value of i.

(Step SB9) The parameter c is set to 0, and the flag is updated to indicate a state outside a period of coincidence with the change pattern of the built-in operating states.

(Step SB10) It is judged whether the value of i exceeds N and whether replacement checking has been performed for all the stored operating states. If i exceeds N (YES), the flow advances to step SB11; otherwise (NO), the flow returns to step SB2.

(Step SB11) It is judged whether the replacement checking has been ended for all user-defined operating states and whether to end identification code replacement after the end of. If the identification code replacement is to be ended (YES), the flow ends; otherwise (NO), the flow returns to step SB1 after the user-defined operating state as the replacement target is changed.

Figure 9:
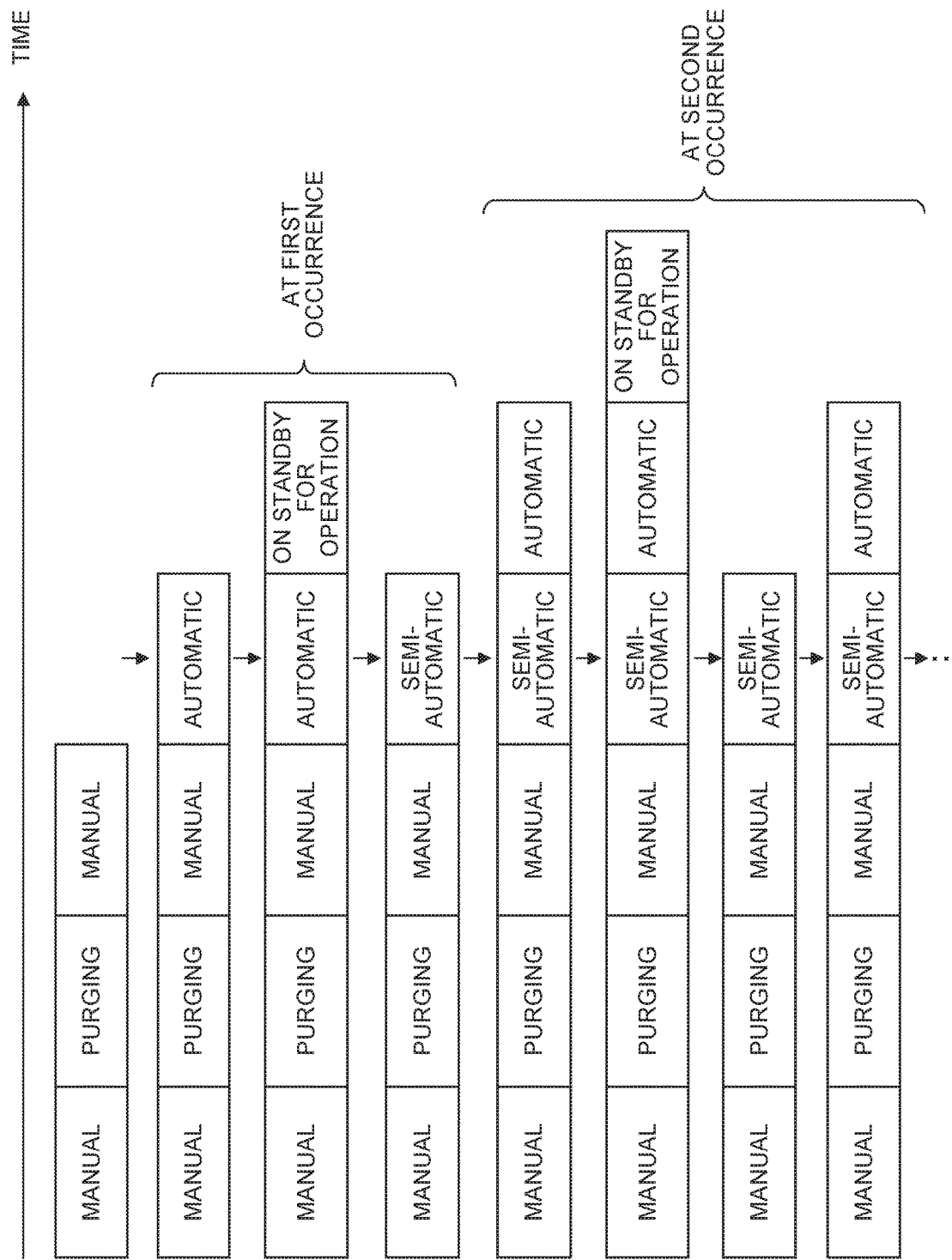
FIG. 9 is a chart showing how operating states stored in an operating state storage unit transition in a case where replacement is performed simultaneously with operating state storage.

FIG. 9 shows how operating states stored in the operating state storage unit 34 transition in a case where replacement with a user-defined operating state is performed simultaneously with operating state storage. At a first occurrence of a change pattern of built-in operating states, when "automatic" is followed by "on standby for operation", the sequence coincides with a combination of "automatic" and "on standby for operation" in that order which is defined as the set user-defined operating state "semi-automatic", and the two operating states "automatic" and "on standby for operation" in that order are replaced with "semi-automatic". After that, if the combination of "automatic" and "on standby for operation" in that order occurs for a second time in a row, the change in operating state from "automatic" to "on standby for operation" also coincides with the user-defined operating state "semi-automatic". At a second or subsequent occurrence in a case where a change in operating state from "automatic" to "on standby for operation" occurs twice or more times in a row, the user-defined operating state "semi-automatic" is already present due to replacement with the user-defined operating state at a first occurrence. For this reason, the second occurrence of the operating states "automatic" and "on standby for operation" in that order is deleted to be integrated into "semi-automatic" that has replaced the first occurrence.

Note that, if a change in operating state corresponding to a user-defined operating state occurs for a second or subsequent time in a row in the above-described case, the occurrence is deleted. Alternatively, it is possible to perform replacement with a user-defined operating state if a change in operating state corresponding to the user-defined operating state occurs for a second or subsequent time in a row and replace consecutive occurrences of the user-defined operating state, if any, into a single occurrence of the user-defined operating state. In either case, a single occurrence of a user-defined operating state is obtained as a result, and the same result can be obtained.

An example will be described in which, after storage of changes in operating state, the changes are collectively replaced with a user-defined operating state. FIG. 10 shows how operating states stored in the operating state storage unit 34 transition in a case where replacement with a user-defined operating state is performed regardless of operating state storage. In the example in FIG. 10, replacement with a user-defined operating state is not performed for each occurrence. At a time when the operating state "manual" occurs after changes from "automatic" to "on standby for operation", then to "automatic", and then to "on standby for operation" occur in a row, and repetition of a change pattern with "automatic" and "on standby for operation" in that order ends, repeated occurrences of the change pattern with "automatic" and "on standby for operation" in that order are replaced with "semi-automatic". An example of stored operating states after replacement which are finally obtained in a case of replacement for each occurrence is no different from an example in a case of collective replacement.

As described above, a plurality of operating states among operating states stored in the operating state storage unit 34 are combined into a user-defined operating state. This allows a worker to more easily view an operating condition and to easily grasp the operating condition.

In the present embodiment, all of components, such as a storage device and a data processing unit, are inside an injection molding machine alone. It is also possible to connect a plurality of injection molding machines to a computer for management using a communication network and include some of components, such as a data processing unit, in the computer for management. In a case of this configuration, the operations below are performed.

The computer for management acquires built-in operating states for each injection molding machine and stores the built-in operating states in chronological order. The computer for management is configured to allow a user to define a user-defined operating state. The computer for management stores user-defined operating states. The computer for management then replaces a section which coincides with a change pattern set in advance of built-in operating states with a user-defined operating state on the basis of the user-defined operating states stored in the computer for management and stores the user-defined operating state. As a method for replacement with a user-defined operating state, the same replacement method as that adopted in the above-described case where components are included in a single injection molding machine is adopted.

In this case, a user-defined operating state which a user can define using the computer for management may be common to all the injection molding machines or exclusive to a particular injection molding machine. In a latter case, a user-defined operating state is stored in a storage device of the computer for management for each injection molding machine, and different user-defined operating states are used for each injection molding machine.

As another configuration, an external computer different from the computer for management may be prepared, and the external computer may be configured to allow a user to define a user-defined operating state. In a case of the configuration, the operations below are performed.

Each injection molding machine or the computer for management acquires a user-defined operating state defined by a user from the external computer. A user-defined operating state which a user can define using the external computer may be common to all injection molding machines connected to the external computer or exclusive to a particular injection molding machine. In a latter case, a user-defined operating state is stored in a storage device of the external computer for each injection molding machine.

The invention claimed is:

1. An injection molding machine, comprising:
a processor configured, upon a change in an operating state of the injection molding machine changes, to output an operating state identification code corresponding to the operating state after change;
a storage device configured to store a plurality of the operating state identification codes output by the processor in chronological order,
wherein the plurality of the operating state identification codes output by the processor in the chronological order corresponds to built-in operating states of the injection molding machine; and
a display device configured to set
a user-defined operating state associated with a change pattern of the built-in operating states, the change pattern including a sequence of the operating state identification codes, and
a change pattern-associated identification code that is an identification code associated with the change pattern, wherein
the storage device is further configured to store the change pattern and the change pattern-associated identification code in association with each other,
the processor is further configured to, upon occurrence of operating states of the injection molding machine corresponding to the user-defined operating state,
among the operating state identification codes stored in the chronological order in the storage device, collectively replace the sequence of the operating state identification codes, which coincides with the change pattern stored in the storage device, with the change pattern-associated identification code associated with the change pattern,
replace the built-in operating states with the user-defined operating state, and
cause the display device to display (i) the change pattern-associated identification code associated with the change pattern and (ii) the user-defined operating state associated with the change pattern,
the built-in operating states include at least one of manual operating state of the injection molding machine or automatic operating state of the injection molding machine, and
the user-defined operating state includes a semi-automatic operating state of the injection molding machine.

2. An injection molding machine, comprising:
a processor configured, upon a change in an operating state of the injection molding machine changes, to output an operating state identification code corresponding to the operating state after change;
a storage device configured to store a plurality of the operating state identification codes output by the processor in chronological order,
wherein the plurality of the operating state identification codes output by the processor in the chronological order corresponds to built-in operating states of the injection molding machine; and
a display device configured to set
a user-defined operating state associated with a change pattern of the built-in operating states, the change pattern including a sequence of the operating state identification codes, and
a change pattern-associated identification code that is an identification code associated with the change pattern,
wherein
the storage device is further configured to store the change pattern and the change pattern-associated identification code in association with each other,
the processor is further configured to, upon occurrence of operating states of the injection molding machine corresponding to the user-defined operating state,
among the operating state deification codes stored in the chronological order in the storage device, collectively replace the sequence of the operating state identification codes with the change pattern-associated identification code associated with the change pattern each time the operating state identification codes coincides with the change pattern stored in the storage device,
replace the built-in operating states with the user-defined operating state,
replace a plurality of occurrences of the change pattern-associated identification code with a single occurrence of the change pattern-associated identification code when there are the occurrences of the change pattern-associated identification code in a row, and
cause the display device to display (i) the change pattern-associated identification code associated with the change pattern, (ii) the user-defined operating state associated with the change pattern,
the built-in operating states include at least one of manual operating state of the injection molding machine or automatic operating state of the injection molding machine, and
the user-defined operating state includes a semi-automatic operating state of the injection molding machine.

3. An injection molding machine comprising:
a processor configured, upon a change in an operating state of the injection molding machine changes, to output an operating state identification code corresponding to the operating state after change;
a storage device configured to store a plurality of the operating state identification codes output by the processor in chronological order,
wherein the plurality of the operating state identification codes output by the processor in the chronological order corresponds to built-in operating states of the injection molding machine; and
a display device configured to set
a user-defined operating state associated with a change pattern of the built-in operating states, the change pattern including a sequence of the operating state identification codes, and
a change pattern-associated identification code that is an identification code associated with the change pattern,
wherein
the storage device is further configured to store the change pattern and the change pattern-associated identification code in association with each other,
the processor is further configured to, upon occurrence of operating states of the injection molding machine corresponding to the user-defined operating state,
among the operating state deification codes stored in the chronological order in the storage device, collectively replace the sequence of the operating state identification codes, which coincides with the change pattern stored in the storage device, with the change pattern-associated identification code associated with the change pattern,
replace the built-in operating states with the user-defined operating state, and
cause the display device to display (i) the change pattern-associated identification code associated with the change pattern and (ii) the user-defined operating state associated with the change pattern,
the display device is further configured to use one of a plurality of the change pattern-associated identification codes as the operating state identification code used to set a different one of the change pattern-associated identification codes,
the built-in operating states include at least one of manual operating state of the injection molding machine or automatic operating state of the injection molding machine, and
the user-defined operating state including a semi-automatic operating state of the injection molding machine.

4. The injection molding machine according to claim 1, wherein
the display device is configured to set a change pattern of the operating state which is composed of a different number of the operating state identification codes for each of the change pattern-associated identification code.

5. The injection molding machine according to claim 2, wherein
the display device is configured to set a change pattern of the operating state which is composed of a different number of the operating state identification codes for each of the change pattern-associated identification code.

6. The injection molding machine according to claim 3, wherein
the display device is configured to set a change pattern of the operating state which is composed of a different number of the operating state identification codes for each of the change pattern-associated identification code.

7. The injection molding machine according to claim 1, wherein
the display device is configured to set a priority to the change pattern-associated identification code, and
the processor is configured to replace the operating state identification codes, a change between which coincides with the change pattern stored in storage device, with the change pattern-associated identification code associated with the change pattern in descending order of the priority.

8. The injection molding machine according to claim 2, wherein
the display device is configured to set a priority to the change pattern-associated identification code, and
the processor is configured to replace the operating state identification codes, a change between which coincides with the change pattern stored in the storage device, with the change pattern-associated identification code associated with the change pattern in descending order of the priority.

9. The injection molding machine according to claim 3, wherein
the display device is configured to set a priority to the change pattern-associated identification code, and
the processor is configured to replace the operating state identification codes, a change between which coincides with the change pattern stored in storage device, with the change pattern-associated identification code associated with the change pattern in descending order of the priority.

10. The injection molding machine according to claim 4, wherein
the display device is configured to set a priority to the change pattern-associated identification code, and
the processor is configured to replace the operating state identification codes, a change between which coincides with the change pattern stored in the storage device, with the change pattern-associated identification code associated with the change pattern in descending order of the priority.

11. The injection molding machine according to claim 5, wherein
the display device is configured to set a priority to the change pattern-associated identification code, and
the processor is configured to replace the operating state identification codes, a change between which coincides with the change pattern stored in the storage device, with the change pattern-associated identification code associated with the change pattern in descending order of the priority.

12. The injection molding machine according to claim 6, wherein
the display device is configured to set a priority to the change pattern-associated identification code, and
the processor is configured to replace the operating state identification codes, a change between which coincides with the change pattern stored in the storage device, with the change pattern-associated identification code associated with the change pattern in descending order of the priority.

13. The injection molding machine according to claim 1, wherein
the semi-automatic operating state corresponds to and replaces a first set of built-in operating states the automatic operating state and a standby operating state,
the user-defined operating state includes at least one of
another user-defined operating state during resin switching, said another user-defined operating state corresponds to and replaces a second set of built-in operating states a purging operating state and the manual operating state, or
a further user-defined operating state during die replacement, said further user-defined operating state corresponds to and replaces a third set of built-in operating states the manual operating state and a die height adjustment state.

14. The injection molding machine according to claim 1, wherein
in response to a first occurrence of the operating states of the injection molding machine corresponding to the user-defined operating state, the processor is configured to replace the built-in operating states with the user-defined operating state in the storage device, and
in response to a second occurrence of the same operating states of the injection molding machine corresponding to the user-defined operating state, the processor is configured to delete the built-in operating states in the second occurrence from the storage device by integrating the built-in operating states in the second occurrence into the user-defined operating state.

15. The injection molding machine according to claim 1, wherein
in response to repeated occurrences of the operating states of the injection molding machine corresponding to the user-defined operating state, the processor is configured to replace the built-in operating states with the user-defined operating state at a last occurrence of the repeated occurrences.

* * * * *